(12) United States Patent
Käppi et al.

(10) Patent No.: US 12,399,011 B2
(45) Date of Patent: Aug. 26, 2025

(54) METHOD AND APPARATUS FOR ERROR MITIGATION IN AN INERTIAL NAVIGATION SYSTEM

(71) Applicant: HERE GLOBAL B.V., Eindhoven (NL)

(72) Inventors: Jani Käppi, Tampere (FI); Tuomo Honkanen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 631 days.

(21) Appl. No.: 17/657,220

(22) Filed: Mar. 30, 2022

(65) Prior Publication Data
US 2023/0314143 A1  Oct. 5, 2023

(51) Int. Cl.
*G01C 21/16* (2006.01)

(52) U.S. Cl.
CPC .................................. *G01C 21/188* (2020.08)

(58) Field of Classification Search
None
See application file for complete search history.

(56) References Cited

U.S. PATENT DOCUMENTS

| | | | |
|---|---|---|---|
| 8,275,582 B1 * | 9/2012 | Vidmar | G01C 21/183 73/1.77 |
| 9,846,239 B2 | 12/2017 | Cho | |
| 10,809,388 B1 | 10/2020 | Carcanague et al. | |
| 2016/0069690 A1 * | 3/2016 | Li | G01C 21/206 701/411 |
| 2017/0219359 A1 * | 8/2017 | Elhoushi | G01S 19/01 |
| 2017/0314928 A1 * | 11/2017 | Perrot | G01C 21/188 |
| 2019/0339396 A1 | 11/2019 | Turunen | |
| 2020/0132860 A1 * | 4/2020 | Dmitrievich | G01S 19/07 |
| 2020/0193194 A1 * | 6/2020 | Zhang | G06F 18/217 |
| 2021/0239848 A1 * | 8/2021 | Karvounis | G01S 19/243 |
| 2021/0263161 A1 | 8/2021 | Broumandan | |

* cited by examiner

*Primary Examiner* — Shelby A Turner
*Assistant Examiner* — Brandon J Becker
(74) *Attorney, Agent, or Firm* — ALSTON & BIRD LLP

(57) ABSTRACT

A method, apparatus and computer program product are configured to mitigate error in an inertial navigation system (INS) that relies upon a reference system to determine or update filter parameters. In a method, a determination is made of (i) deviation or divergence of a filter of the INS and/or (ii) invalidity of observation(s) by the reference system. The method also identifies the filter parameters from a history buffer associated with a prior point in time at which performance of the filter is stable. The filter parameters were updated at least once based upon observation(s) by the reference system after the prior point in time. The method forward processes sensor samples of the INS obtained subsequent to the prior point in time using the filter parameters from the history buffer at which performance of the filter was stable to mitigate the error.

20 Claims, 4 Drawing Sheets

METHOD AND APPARATUS FOR ERROR MITIGATION IN AN INERTIAL NAVIGATION SYSTEM

TECHNOLOGICAL FIELD

An example embodiment relates generally to a technique for error mitigation in an inertial navigation system that relies upon a reference system, such as a satellite-based positioning system, to determine or update filter parameters.

BACKGROUND

In order to determine its position, some vehicles or other systems rely upon an inertial navigation system (INS). The INS is carried by the vehicle or other system and utilizes dead reckoning to determine the current position of the vehicle or other system based upon a prior position of the vehicle or other system in combination with motion data of the vehicle or other system. The prior position of the vehicle or other system may have been previously determined utilizing a reference system, such as, a satellite-based positioning technique, e.g., a Global Navigation Satellite System (GNSS)-based positioning technique. The INS may also include an inertial measurement unit (IMU) that determines the motion data defining the movement of the vehicle or other system from the point in time at which the prior position was previously determined to a subsequent point in time at which the current position of the vehicle or other system is determined by utilizing dead reckoning. In operation, the INS processes the measurements provided by the IMU and calculates, utilizing equations of motion, the vehicle states in the navigation frame defined by movement by the vehicle or other system. The INS includes one or more filters to estimate the system errors and provides feedback to cancel or reduce the effect of the errors. The performance of the filters is defined by filter parameters which, in turn, are updated by the observations provided by the reference system.

The performance of the INS may be negatively impacted in an instance in which one or more observations provided by the reference system are inaccurate. For example, in an instance in which the filter parameters of the INS are updated based upon inaccurate observations provided by a satellite-based positioning system and, more particularly, by a GNSS-based positioning system, the filter parameters of the filters of the INS may be updated in such a way that the navigation solution generated by the INS has reduced accuracy. In an effort to reduce the instances in which an incorrect observation by a GNSS-based positioning system is utilized to update the filter parameters of the INS in a manner that results in the generation of a less accurate navigation solution, techniques have been developed in an effort to identify GNSS observations that are outliers from other GNSS observations captured during a similar time period, such as by identifying a GNSS observation that deviates appreciably from other GNSS observations from the similar time period. Once a GNSS observation is identified as an outlier, the GNSS observation may be excluded from consideration and not be used to update of the filter parameters so as to avoid reducing the accuracy of the resulting navigation solution.

In some instances, however, a GNSS observation that is inaccurate is not detected as an outlier. For example, in instances in which a number of GNSS observations within the same period of time all exhibit inaccuracies, such as in an urban environment, the inaccurate GNSS observations may not be reliably identified. In an instance in which a GNSS observation that is inaccurate is not detected as an outlier, the GNSS observation may then be utilized to update the filter parameters which, in turn, shifts or modifies the filter states of the filters of the INS and correspondingly reduces the accuracy of the navigation solution generated by the INS. In some cases, the reliance upon inaccurate GNSS observations to update the filter parameters may cause the filters to diverge. In an instance in which one or more additional GNSS observations are received after the filter parameters have been updated in reliance upon an inaccurate GNSS observation, the INS can provide an updated navigation solution based upon the one or more additional GNSS observations, but the resulting navigation solution may include a location and velocity that are biased due to the reliance upon an inaccurate GNSS observation to update the filter parameters.

Techniques, such as filter diagnostic modules, e.g., watchdogs, have been developed to monitor various statistics and metrics associated with the performance of the filters of an INS and to identify an instance in which the filters are not performing properly. In such an instance, the filters may be restarted and the navigation solution of the INS may be reinitialized. However, the process of restarting the filters and reinitializing the navigation solution of the INS may take some time, such as one or more minutes, during which the INS in unable to provide an accurate navigation solution.

BRIEF SUMMARY

A method, apparatus and computer program product are provided in accordance with an example embodiment in order to provide for error mitigation in an inertial navigation system (INS) that relies upon a reference system, such as a satellite-based positioning system, to determine or update filter parameters. In response to determining one or more of: (i) deviation or divergence of a filter of an INS or (ii) that one or more observations by the reference system are invalid, the sensor samples of the INS are processed to determine the navigation solution using filter parameters that are determined in such a manner as to mitigate one or more errors previously introduced by an inaccurate observation of the reference system. As a result, the method, apparatus and computer program product of an example embodiment can more improve or correct the performance of the INS in a more timely manner such that the INS generates a more accurate navigation solution in a more consistent manner and such that any inaccuracies in the navigation solution introduced by an inaccurate observation of a satellite-based positioning system can be more quickly remedied while continuing to provide a navigation solution.

In an example embodiment, a method is provided for error mitigation in an inertial navigation system (INS) that relies upon a reference system to determine or update filter parameters. The method includes determining one or more of: (i) deviation or divergence of a filter of the INS or (ii) that one or more observations by the reference system are invalid. In response to determining one or more of (i) the deviation or divergence of the filter or (ii) that one or more observations by the reference system are invalid, the method also includes identifying the filter parameters from a history buffer associated with a prior point in time at which performance of the filter is stable. The filter parameters were updated at least once based upon one or more observations by the reference system between the prior point in time and a subsequent point in time at which the filter was determined to deviate or diverge or one or more observations by the reference system were determined to be invalid. The method further includes forward processing sensor samples of the INS obtained subsequent to the prior point in time using the filter parameters from the history buffer at which performance of the filter was stable, thereby mitigating one or more errors previously introduced by at least one of the one or more observations by the reference system.

The method of an example embodiment forward processes sensor samples of the INS by forward processing sensor samples of the INS without updating the filter parameters based upon the one or more observations by the reference system between the prior and subsequent points to recover a navigation solution of the INS. In an example embodiment, the forward processing of sensor samples of the INS includes forward processing sensor samples of the INS without updating the filter parameters based upon any observations of the reference system to recover a navigation solution of the INS. The method of an example embodiment also includes storing, in the history buffer, historical values of at least: (i) the filter parameters and (ii) the sensor samples by the reference system.

In an embodiment in which the reference system includes a global navigation satellite system (GNSS), the method further includes receiving observations from the GNSS providing information regarding a location and velocity of a body at a respective point in time and updating the filter parameters based upon the location and velocity provided by the GNSS at the respective point in time. The method of an example embodiment determines the deviation or divergence of the filter by utilizing a null hypothesis in which the null hypothesis that the one or more observations of the reference system are bias free is tested against a test hypothesis that the one or more observations of the reference system are biased to determine whether the filter has deviated or diverged. In another example embodiment, the method determines deviation or divergence of the filter by utilizing a normalized innovation squared measure having a value that increases with increasing error to determine whether the filter has deviated or diverged.

The method of an example embodiment determines the deviation or divergence of the filter by determining a second navigation solution of the INS utilizing a second filter having filter parameters that have not been updated based upon the one or more observations by the reference system following the prior point in time. In this example embodiment, the method also includes comparing a navigation solution of the INS that relies upon filter parameters that have been updated by the one or more observations by the reference system to the second navigation solution of the INS. The method of this example embodiment further includes determining whether the filter has deviated or diverged based upon a difference between the navigation solution of the INS to the second navigation solution of the INS.

The method of an example embodiment also includes validating the one or more observations by the reference system prior to updating the filter parameters based upon one or more observations by the reference system. In this example embodiment, validating a respective observation of the one or more observations includes comparing a reference location and a reference velocity defined by the respective observation by the reference system to a location and a velocity of an object determined by the INS utilizing a filter having filter parameters that have not been updated by the respective observation by the reference system.

The method of an example embodiment also includes validating the one or more observations by the reference system prior to updating the filter parameters based upon the one or more observations by the reference system. In this regard, validating a respective observation of the one or more observations includes evaluating the respective observation by the reference system without consideration of a navigation solution of the INS. In this example embodiment, evaluating the respective observation by the reference system includes evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

In another example embodiment, an apparatus is provided that is configured to mitigate error in an inertial navigation system (INS) that relies upon a reference system to determine or update filter parameters. The apparatus includes processing circuitry and at least one memory including computer program code with the at least one memory and the computer program code configured to, with the processing circuitry, cause the apparatus to determining one or more of: (i) deviation or divergence of a filter of the INS or (ii) that one or more observations by the reference system are invalid. In response to determining one or more of (i) the deviation or divergence of the filter or (ii) that one or more observations by the reference system are invalid, the at least one memory and the computer program code are also configured to, with the processing circuitry, cause the apparatus to identify the filter parameters from a history buffer associated with a prior point in time at which performance of the filter is stable. The filter parameters were updated at least once based upon one or more observations by the reference system between the prior point in time and a subsequent point in time at which the filter was determined to deviate or diverge or one or more observations by the reference system were determined to be invalid. The at least one memory and the computer program code are further configured to, with the processing circuitry, cause the apparatus to forward process sensor samples of the INS obtained subsequent to the prior point in time using the filter parameters from the history buffer at which performance of the filter was stable, thereby mitigating one or more errors previously introduced by at least one of the one or more observations by the reference system.

The at least one memory and the computer program code are configured to, with the processing circuitry, cause the apparatus of an example embodiment to forward processes sensor samples of the INS by forward processing sensor samples of the INS without updating the filter parameters based upon the one or more observations by the reference system between the prior and subsequent points to recover a navigation solution of the INS. In an example embodiment, the at least one memory and the computer program code are configured to, with the processing circuitry, cause the apparatus to forward process sensor samples of the INS by forward processing sensor samples of the INS without updating the filter parameters based upon any observations of the reference system to recover a navigation solution of the INS. The at least one memory and the computer program code are configured to, with the processing circuitry, cause the apparatus of an example embodiment to store, in the history buffer, historical values of at least: (i) the filter parameters and (ii) the sensor samples by the reference system.

In an embodiment in which the reference system includes a global navigation satellite system (GNSS), the at least one memory and the computer program code are further configured to, with the processing circuitry, cause the apparatus to receive observations from the GNSS providing information regarding a location and velocity of a body at a respective point in time and update the filter parameters based upon the location and velocity provided by the GNSS at the respective point in time. The at least one memory and the computer program code are configured to, with the processing circuitry, cause the apparatus of an example embodiment to determine the deviation or divergence of the filter by utilizing a null hypothesis in which the null hypothesis that the one or more observations of the reference system are bias free is tested against a test hypothesis that the one or more observations of the reference system are biased to determine whether the filter has deviated or diverged. In another example embodiment, the at least one memory and the computer program code are configured to, with the processing circuitry, cause the apparatus to determine deviation or divergence of the filter by utilizing a normalized innovation squared measure having a value that increases with increasing error to determine whether the filter has deviated or diverged.

The at least one memory and the computer program code are configured to, with the processing circuitry, cause the apparatus of an example embodiment to determine the deviation or divergence of the filter by determining a second navigation solution of the INS utilizing a second filter having filter parameters that have not been updated based upon the one or more observations by the reference system following the prior point in time. In this example embodiment, the at least one memory and the computer program code are configured to, with the processing circuitry, cause the apparatus to compare a navigation solution of the INS that relies upon filter parameters that have been updated by the one or more observations by the reference system to the second navigation solution of the INS. The at least one memory and the computer program code are also configured to, with the processing circuitry, cause the apparatus of this example embodiment to determine whether the filter has deviated or diverged based upon a difference between the navigation solution of the INS to the second navigation solution of the INS.

The at least one memory and the computer program code are configured to, with the processing circuitry, cause the apparatus of an example embodiment to validate the one or more observations by the reference system prior to updating the filter parameters based upon one or more observations by the reference system. In this example embodiment, the at least one memory and the computer program code are configured to, with the processing circuitry, cause the apparatus to validate a respective observation of the one or more observations by comparing a reference location and a reference velocity defined by the respective observation by the reference system to a location and a velocity of an object determined by the INS utilizing a filter having filter parameters that have not been updated by the respective observation by the reference system.

The at least one memory and the computer program code are configured to, with the processing circuitry, cause the apparatus of an example embodiment to validate the one or more observations by the reference system prior to updating the filter parameters based upon the one or more observations by the reference system. In this regard, at least one memory and the computer program code are configured to, with the processing circuitry, cause the apparatus to validate a respective observation of the one or more observations by evaluating the respective observation by the reference system without consideration of a navigation solution of the INS. In this example embodiment, at least one memory and the computer program code are configured to, with the processing circuitry, cause the apparatus to evaluate the respective observation by the reference system by evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

In a further example embodiment, a computer program product is provided that is configured to mitigate error in an inertial navigation system (INS) that relies upon a reference system to determine or update filter parameters. The computer program product includes at least one non-transitory computer-readable storage medium having computer-executable program code instructions stored therein with the computer-executable program code instructions including program code instructions to determine one or more of: (i) deviation or divergence of a filter of the INS or (ii) that one or more observations by the reference system are invalid. In response to determining one or more of (i) the deviation or divergence of the filter or (ii) that one or more observations by the reference system are invalid, the computer-executable program code instructions also include program code instructions to identify the filter parameters from a history buffer associated with a prior point in time at which performance of the filter is stable. The filter parameters were updated at least once based upon one or more observations by the reference system between the prior point in time and a subsequent point in time at which the filter was determined to deviate or diverge or one or more observations by the reference system were determined to be invalid. The computer-executable program code instructions further include program code instructions to forward process sensor samples of the INS obtained subsequent to the prior point in time using the filter parameters from the history buffer at which performance of the filter was stable, thereby mitigating one or more errors previously introduced by at least one of the one or more observations by the reference system.

The program code instructions of an example embodiment to forward process sensor samples of the INS include program code instructions to forward process sensor samples of the INS without updating the filter parameters based upon the one or more observations by the reference system between the prior and subsequent points to recover a navigation solution of the INS. In an example embodiment, the program code instructions to forward process sensor samples of the INS include program code instructions to forward process sensor samples of the INS without updating the filter parameters based upon any observations of the reference system to recover a navigation solution of the INS. The program code instructions of an example embodiment also include program code instructions to store, in the history buffer, historical values of at least: (i) the filter parameters and (ii) the sensor samples by the reference system.

In an embodiment in which the reference system includes a global navigation satellite system (GNSS), the computer-executable program code instructions further include program code instructions to receive observations from the GNSS providing information regarding a location and velocity of a body at a respective point in time and update the filter parameters based upon the location and velocity provided by the GNSS at the respective point in time. The program code instructions of an example embodiment to determine the deviation or divergence of the filter include program code instructions to utilize a null hypothesis in which the null hypothesis that the one or more observations of the reference system are bias free is tested against a test hypothesis that the one or more observations of the reference system are biased to determine whether the filter has deviated or diverged. In another example embodiment, the program code instructions to determine deviation or divergence of the filter include program code instructions to utilize a normalized innovation squared measure having a value that increases with increasing error to determine whether the filter has deviated or diverged.

The program code instructions of an example embodiment to determine the deviation or divergence of the filter include program code instructions to determine a second navigation solution of the INS utilizing a second filter having filter parameters that have not been updated based upon the one or more observations by the reference system following the prior point in time. In this example embodiment, the program code instructions to determine the deviation or divergence of the filter also include program code instructions to compare a navigation solution of the INS that relies upon filter parameters that have been updated by the one or more observations by the reference system to the second navigation solution of the INS. The program code instructions of this example embodiment to determine the deviation or divergence of the filter further include program code instructions to determine whether the filter has deviated or diverged based upon a difference between the navigation solution of the INS to the second navigation solution of the INS.

The computer-executable program code instructions of an example embodiment also include program code instructions to validate the one or more observations by the reference system prior to updating the filter parameters based upon one or more observations by the reference system. In this example embodiment, the program code instructions to validate a respective observation of the one or more observations include program code instructions to compare a reference location and a reference velocity defined by the respective observation by the reference system to a location and a velocity of an object determined by the INS utilizing a filter having filter parameters that have not been updated by the respective observation by the reference system.

The computer-executable program code instructions of an example embodiment also include program code instructions to validate the one or more observations by the reference system prior to updating the filter parameters based upon the one or more observations by the reference system. In this regard, the program code instructions to validate a respective observation of the one or more observations include program code instructions to evaluate the respective observation by the reference system without consideration of a navigation solution of the INS. In this example embodiment, the program code instructions to evaluate the respective observation by the reference system include program code instructions to evaluate: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

In yet another example embodiment, an apparatus is provided for error mitigation in an inertial navigation system (INS) that relies upon a reference system to determine or update filter parameters. The apparatus includes means for determining one or more of: (i) deviation or divergence of a filter of the INS or (ii) that one or more observations by the reference system are invalid. In response to determining one or more of (i) the deviation or divergence of the filter or (ii) that one or more observations by the reference system are invalid, the apparatus also includes means for identifying the filter parameters from a history buffer associated with a prior point in time at which performance of the filter is stable. The filter parameters were updated at least once based upon one or more observations by the reference system between the prior point in time and a subsequent point in time at which the filter was determined to deviate or diverge or one or more observations by the reference system were determined to be invalid. The apparatus further includes means for forward processing sensor samples of the INS obtained subsequent to the prior point in time using the filter parameters from the history buffer at which performance of the filter was stable, thereby mitigating one or more errors previously introduced by at least one of the one or more observations by the reference system.

The means for forward processing sensor samples of the INS in an example embodiment includes means for forward processing sensor samples of the INS without updating the filter parameters based upon the one or more observations by the reference system between the prior and subsequent points to recover a navigation solution of the INS. In an example embodiment, the means for forward processing of sensor samples of the INS include means for forward processing sensor samples of the INS without updating the filter parameters based upon any observations of the reference system to recover a navigation solution of the INS. The apparatus of an example embodiment also includes means for storing, in the history buffer, historical values of at least: (i) the filter parameters and (ii) the sensor samples by the reference system.

In an embodiment in which the reference system includes a global navigation satellite system (GNSS), the apparatus further includes means for receiving observations from the GNSS providing information regarding a location and velocity of a body at a respective point in time and means for updating the filter parameters based upon the location and velocity provided by the GNSS at the respective point in time. The means for determining the deviation or divergence of the filter in an example embodiment include means for utilizing a null hypothesis in which the null hypothesis that the one or more observations of the reference system are bias free is tested against a test hypothesis that the one or more observations of the reference system are biased to determine whether the filter has deviated or diverged. In another example embodiment, the means for determining deviation or divergence of the filter includes means for utilizing a normalized innovation squared measure having a value that increases with increasing error to determine whether the filter has deviated or diverged.

The means for determining the deviation or divergence of the filter in accordance with an example embodiment include means for determining a second navigation solution of the INS utilizing a second filter having filter parameters that have not been updated based upon the one or more observations by the reference system following the prior point in time. In this example embodiment, the means for determining the deviation or divergence of the filter also include means for comparing a navigation solution of the INS that relies upon filter parameters that have been updated by the one or more observations by the reference system to the second navigation solution of the INS. The means for determining the deviation or divergence of the filter in accordance with this example embodiment further include means for determining whether the filter has deviated or diverged based upon a difference between the navigation solution of the INS to the second navigation solution of the INS.

The apparatus of an example embodiment also includes means for validating the one or more observations by the reference system prior to updating the filter parameters based upon one or more observations by the reference system. In this example embodiment, the means for validating a respective observation of the one or more observations include means for comparing a reference location and a reference velocity defined by the respective observation by the reference system to a location and a velocity of an object determined by the INS utilizing a filter having filter parameters that have not been updated by the respective observation by the reference system.

The apparatus of an example embodiment also includes means for validating the one or more observations by the reference system prior to updating the filter parameters based upon the one or more observations by the reference system. In this regard, the means for validating a respective observation of the one or more observations include means for evaluating the respective observation by the reference system without consideration of a navigation solution of the INS. In this example embodiment, the means for evaluating the respective observation by the reference system include means for evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

BRIEF DESCRIPTION OF THE DRAWINGS

Figure 1:
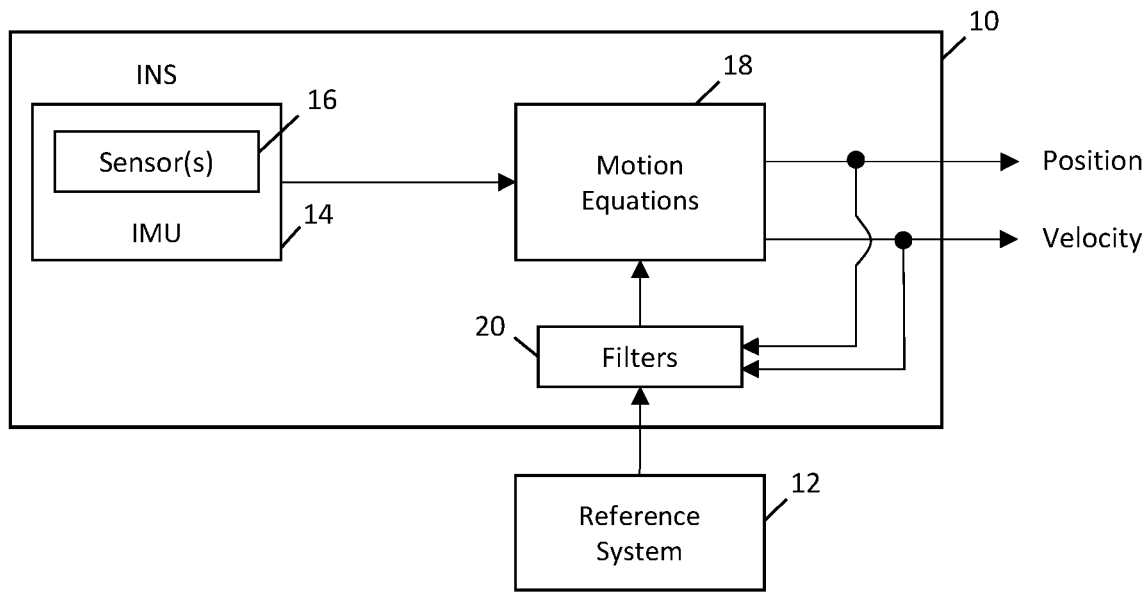
Figure 2:
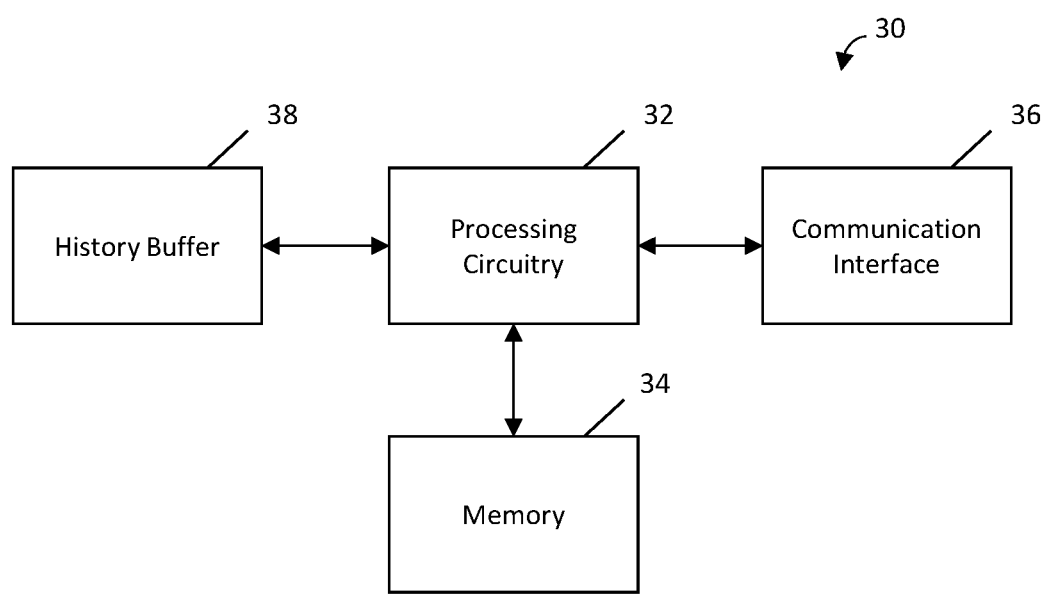
Figure 3:
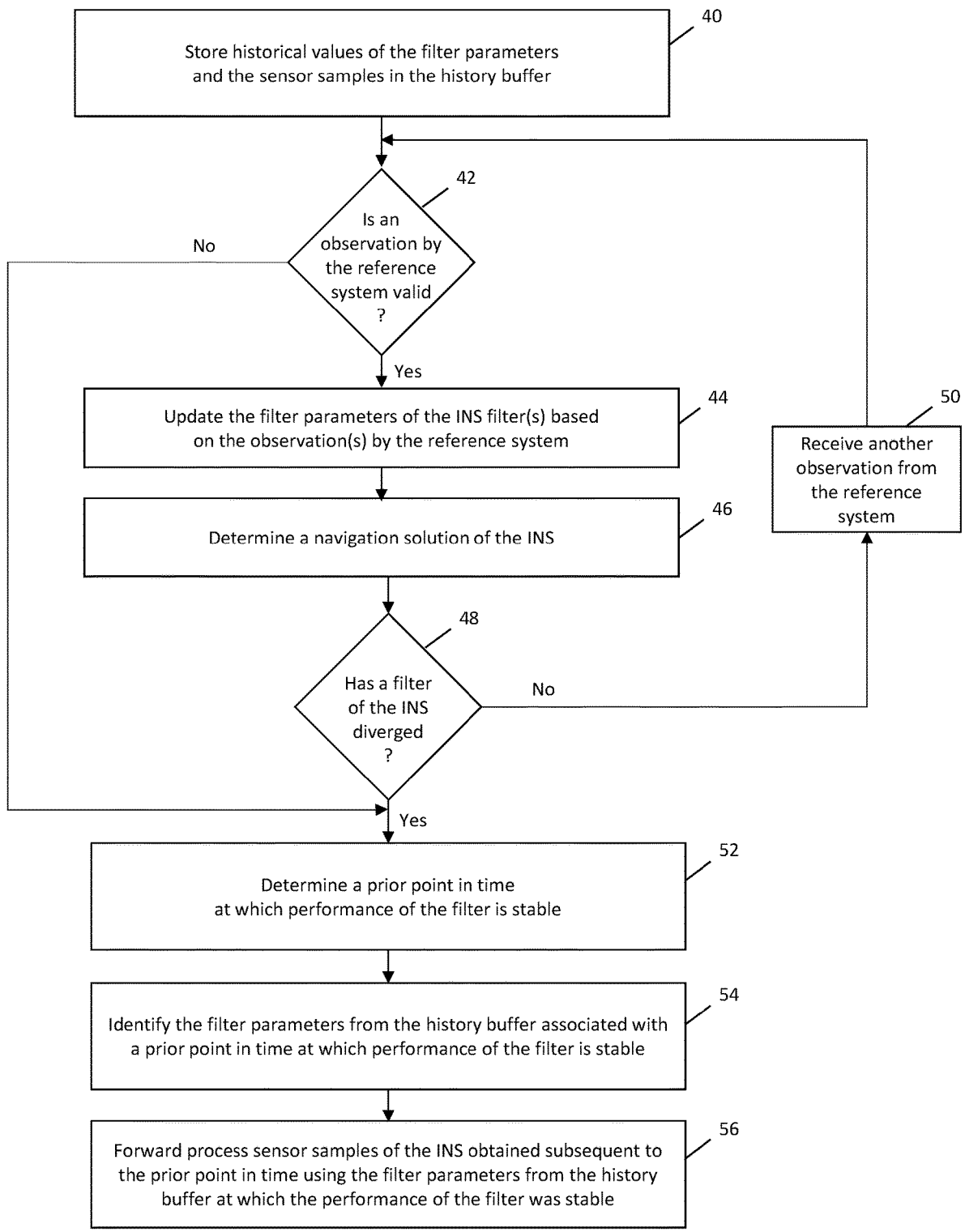
Figure 4:
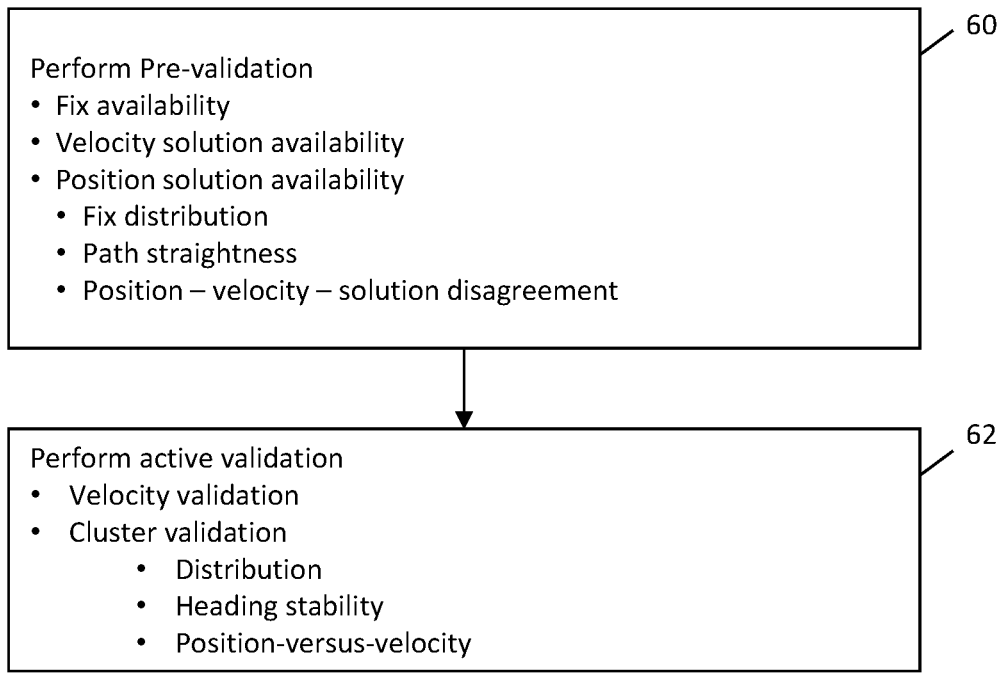
Figure 5:
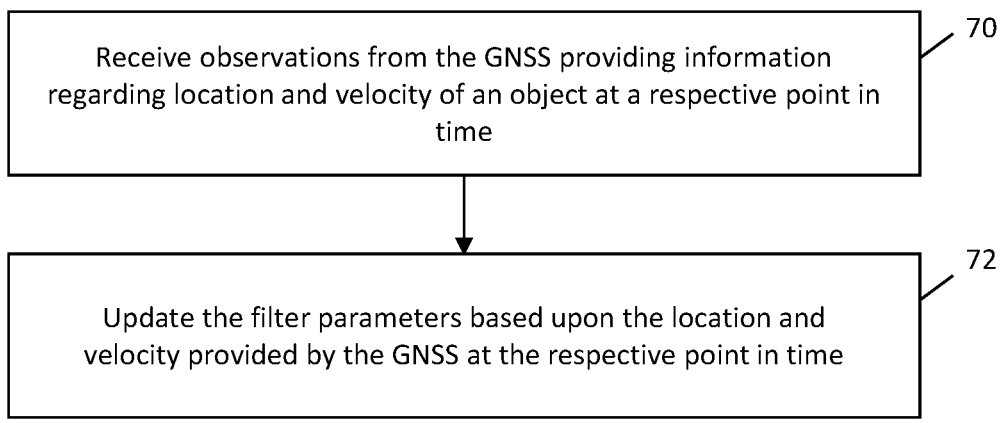
Figure 6:
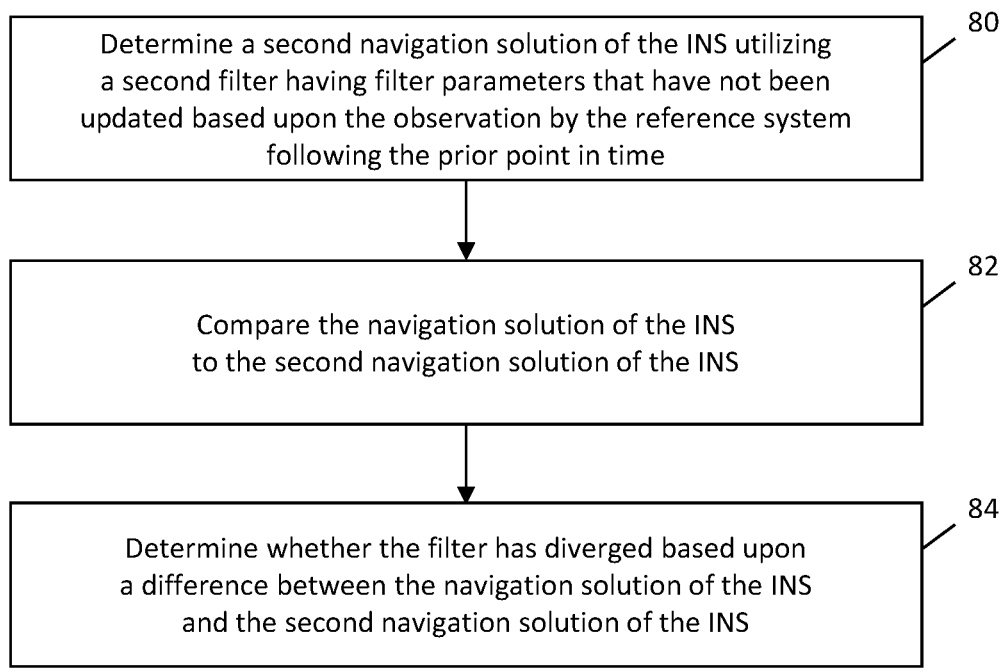

Having thus described example embodiments of the present disclosure in general terms, reference will now be made to the accompanying drawings, which are not necessarily drawn to scale, and wherein:

FIG. 1 is a block diagram of an inertial navigation system (INS) in communication with a reference system, such as a satellite-based positioning system, that may be configured in accordance with an example embodiment of the present disclosure;

FIG. 2 is a block diagram that is an apparatus that may be specifically configured in accordance with an example embodiment of the present disclosure;

FIG. 3 is a flow chart illustrating the operations performed, such as by the apparatus of FIG. 2, in order to provide for error mitigation in an INS that relies upon a reference system to determine or update filter parameters in accordance with an example embodiment of the present disclosure;

FIG. 4 is a flow chart of the operations performed, such as by the apparatus of FIG. 2, in order to validate an observation provided by a reference system in accordance with an example embodiment of the present disclosure;

FIG. 5 is a block diagram of the operations performed, such as by the apparatus of FIG. 2, in order to update filter parameters based upon a GNSS observation; and FIG. 6 is a block diagram of the operations performed, such as by the apparatus of FIG. 2, in order to determine the deviation or divergence of a filter of the INS in accordance with the example embodiment to the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to mitigate error in an inertial navigation system (INS) that relies upon a reference system to determine or update filter parameters. By mitigating the error of an INS, the INS can provide a navigation solution, such as the position and velocity of an object, e.g., a vehicle, a mobile device carried by a vehicle or a person, or the like, that is more consistently accurate. Additionally, the method, apparatus and computer program product of an example embodiment mitigate the error in an INS in such a manner that the number of instances in which the filters of the INS must be restarted and the navigation solution must be reinitialized are reduced, thereby providing a navigation solution in a more continuous manner.

FIG. 1 depicts a system that includes an INS 10 and a reference system 12 in communication therewith. As shown, the INS of this example embodiment includes an inertial measurement unit (IMU) 14 which, in turn, includes one or more sensors 16, such as one or more accelerometers, magnetometers, gyroscopes or the like, for providing sensor samples relating to the motion of the object, such as a vehicle, a person, a device, such a device carried by a vehicle or a person, or the like. In this regard, the INS or at least the IMU is generally carried by the object for which a navigation solution is desired such that the motion of the object is the same as the motion experienced by the IMU. The INS also includes a plurality of motion equations 18, such as may be implemented by a processor or other computing device. The motion equations receive sensor samples indicative of various parameters of the motion of the object, such as parameters indicative of the movement of the object along each of the coordinate axes and parameters indicative of the rotation of the object about each of the coordinate axes. Based upon the sensor samples, the motion equations provide a navigation solution, such as the current position and velocity of the object monitored by the INS.

In order to reduce the errors associated with the navigation solution including those errors attributable to drift experienced by the sensors 16, such as in response to variations in the temperature, the INS 10 also includes a plurality of filters 20, such as one or more Kalman filters. The filters receive the navigation solution, such as the position and velocity, that has been generated by the motion equations 18 and provides feedback to the motion equations in order to reduce the error in the navigation solution. As shown in FIG. 1, the INS may be in communication with a reference system 12, such as a satellite-based positioning system, and, in one embodiment that is described herein by way of example, but not of limitation, a GNSS-based positioning system. The reference system provides observations at each of a plurality of different points in time. The observations may define the position and velocity of the object as determined by the reference system at a respective point in time. Based upon a comparison of the position and velocity of the object as determined by the reference system and the position and velocity of the object as determined by the INS, the filter parameters that define the operation and function of the filters are updated in order to further reduce any error associated the navigation solution of the INS. However, in an instance in which an observation of the reference system is itself inaccurate, the filter parameters of the filters of the INS may be updated in a manner that does not actually reduce an error associated with the navigation solution of the INS but that, instead, increases the inaccuracy of the navigation solution of the INS and, in some cases may cause the filters to deviate or diverge over time.

In order to mitigate the error in the INS 10 that relies upon a reference system 12 to determine or update filter parameters, an apparatus 30 is provided that may be embodied by a computing device, such as the computing device that embodies the INS or another computing device that is in communication with the INS. Alternatively, the apparatus may be embodied by a cloud-based computing system that is also in communication, directly or indirectly, with the INS. Regardless of the manner in which the apparatus is embodied, the apparatus of an example embodiment includes, is associated with or is in communication with processing circuitry 32, a memory device 34 and a communication interface 36, as shown in FIG. 2.

In some embodiments, the processing circuitry 32 (and/or co-processors or any other processors assisting or otherwise associated with the processing circuitry) can be in communication with the memory device 34 via a bus for passing information among components of the apparatus 30. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 32 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 32 can be configured to execute instructions stored in the memory device 34 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 30 of an example embodiment can also include the communication interface 36. The communication interface can be any means such as a device or circuitry embodied in either hardware or a combination of hardware and software that is configured to receive and/or transmit data from/to other electronic devices in communication with the apparatus, such as by providing for communication with the reference station 12. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 3, the operations performed, such as by the apparatus 30 of FIG. 2, in order to provide for error mitigation in the INS 10 that relies upon a reference system 12, such as a satellite-based positioning system, to determine or update filter parameters are depicted. As shown in block 40, the apparatus includes means, such as the processing circuitry 32 or the like, for storing historical values of the filter parameters and the sensor samples in a history buffer 38. Although the history buffer may be provided by the memory 34, the history buffer may, in some embodiments, be a discrete memory device for storing the historical values and for providing ready access to the historical values to the processing circuitry as shown in FIG. 2. Thus, the filter parameters utilized by the filters 20 of the INS during a period of time may be stored along with an identification of the period of time during which the filter parameters were valid. Similarly, the sensor samples provided the IMU 14 may be stored in the history buffer along with an indication of the time at which the sensor samples were captured by the IMU.

In some embodiments, the apparatus 30, such as the processing circuitry 32, the memory 34 or the like, may also be configured to store the historical values of the observations provided by the reference system 12 in the history buffer 38. The observations may be provided by the reference system in various forms. With respect to a GNSS-based positioning system, for example, the GNSS observations may be in the form of raw measurements, such as code phrases, or the GNSS observations may be in the form of location and velocity samples.

In an embodiment in which the reference system 12 is a GNSS-based positioning system, the GNSS observations may be stored by the history buffer 38 along with an indication of the time at which the observation was captured by the GNSS. Although the filter parameters and the sensor samples may be stored in real time or near real time, the GNSS observations are generally provided with some delay relative to the time at which the observations were captured by the GNSS. Thus, the apparatus 30, such as the processing circuitry 32, the history buffer or the like, is configured to store the observations by the reference system in association with the historical values of the filter parameters and the sensor samples that were utilized and captured, respectively, at the same time at which the observations by the reference system were captured even though the filter parameters and sensor samples were received by and stored by the history buffer prior to the receipt of the observations from the reference system.

As shown in block 42 of FIG. 3, the apparatus 30 also includes means, such as the processing circuitry 32 or the like, for determining whether the observation(s) by the reference system 12 are valid prior to updating the filter parameters based upon one or more observations by the reference system. Although the observation(s) by the reference system may be validated in various manners, the apparatus of an example embodiment is configured to perform a pre-validation of an observation followed by an active validation of the observation as shown in FIG. 4. In this example embodiment, the apparatus, such as the processing circuitry, is configured to initially pre-validate an observation by validating the observation in an independent manner without reference to the navigation solution of the INS 10. Although the observations by the reference system may be pre-validated in various manners, one embodiment of the pre-validation of the observation of a reference system, such as a GNSS-based positioning system, is described below by way of example.

In an example embodiment, the apparatus 30 includes means, such as the processing circuitry 32 or the like, for validating a respective observation of the one or more observations by comparing a reference location and a reference velocity defined by the respective observation by the reference system 12 to a location and a velocity of an object determined by the INS 10 utilizing a filter having filter parameters that have not been updated by the respective observation by the reference system. For example the apparatus, such as the processing circuitry, of an example embodiment is configured to pre-validate the GNSS observation based upon fix availability, velocity solution availability and position solution availability. See block 60 of FIG. 4. With respect to the fix availability, the apparatus, such as the processing circuitry, is configured to determine whether the uncertainties associated with the position and velocity of the GNSS observation are within predefined limits. If not, the GNSS observation is determined to be invalid, the GNSS observation is removed from the history buffer 38 such that the GNSS observation is not taken into account in relation updating the filter parameters of the INS 10 and further processing is triggered to mitigate any error in the INS as described below.

However, if the uncertainties are within the predefined limits, the apparatus 30, such as the processing circuitry 32, is configured to determine whether the GNSS observation provides a velocity solution and, if so, whether the velocity solution indicates that the object is moving fast enough, such as by having a velocity of at least a predetermined minimum velocity, to allow for proper initialization. In an instance in which the GNSS observation fails to provide a velocity solution or in which the object is not moving at least the predetermined minimum velocity, the GNSS observation is determined to be invalid, the GNSS observation is removed from the history buffer 38 such that the GNSS observation is not taken into account in relation updating the filter parameters of the INS 10 and further processing is triggered to mitigate any error in the INS as described below.

However, in an instance in which the GNSS observation provides a velocity solution and the object is moving at at least the predetermined minimum velocity, the apparatus 30, such as the processing circuitry 32, of this example embodiment is configured to verify the position solution provided by the GNSS observation. The position solution may be verified in various manners including by evaluating the fix distribution, the path straightness and/or the position-velocity-solution disagreement. In an example embodiment, the apparatus, such as the processing circuitry, is configured to evaluate the fix distribution relative to a fix distribution threshold, to evaluate the path straightness relative to a path straightness threshold and to evaluate the position-velocity-solution disagreement relative to a disagreement threshold. In an instance in which any one or more of the fix distribution, the path straightness and the position-velocity-solution disagreement fail to satisfy the respective threshold, the apparatus, such as the processing circuitry, is configured to determine that the position solution cannot be verified and, as a result, the GNSS observation is determined to be invalid, the GNSS observation is removed from the history buffer 38 such that the GNSS observation is not taken into account in relation updating the filter parameters of the INS 10 and further processing is triggered to mitigate any error in the INS as described below. However, if the GNSS observation satisfies each of the foregoing tests, the GNSS observation is considered to have been pre-validated and remains stored in the history buffer.

In some embodiments, the apparatus 30, such as the processing circuitry 32, is additionally or alternatively configured to validate the observations provided by the reference system 12 while the filters 20 of the INS 10 are in operation, but prior to updating the filter parameters based upon the one or more observations by the reference system. The validation performed while the filters of the INS are in operation may be considered an active validation. In an example embodiment, the apparatus includes means, such as the processing circuitry or the like, for validating a respective observation of the one or more observations by evaluating the respective observation by the reference system without consideration of a navigation solution of the INS. In this regard, the apparatus of an example embodiment includes means, such as the processing circuitry or the like, for evaluating the respective observation by the reference system by evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

In relation to the active validation performed by the apparatus 30, such as the processing circuitry 32 of an example embodiment, the position and velocity provided by the observation, such as the observation of a GNSS positioning system, may be compared to the position and velocity of the object determined through operation of the filters 20 in order to determine if the GNSS observation is valid. Although active validation may be performed in various manners, the apparatus, such as the processing circuitry, of an example embodiment is configured to perform active validation in the form of velocity validation of the GNSS observation. See block 62 of FIG. 4. In this regard, one or more velocity-related comparisons may be implemented, such as comparisons of the speed change, the derived acceleration, the heading rate and/or centripetal acceleration of the GNSS observation relative to respective thresholds. In an instance in which the velocity-based thresholds are satisfied, the GNSS observation is determined to have satisfied the velocity validation. However, if one or more of the velocity-related comparisons is not satisfied, the GNSS observation is determined to be invalid, the GNSS observation is removed from the history buffer 38 such that the GNSS observation is not taken into account in relation updating the filter parameters of the INS and further processing is triggered to mitigate any error in the INS as described below.

The apparatus 30, such as the processing circuitry 32, of an example embodiment additionally or alternatively provides for active validation of the GNSS observations utilizing a cluster validation technique. In one embodiment, for example, the apparatus, such as the processing circuitry, is configured to implement cluster validation if a GNSS observation has satisfied the velocity validation. In regards to cluster validation, the apparatus, such as the processing circuitry, is configured to compare a cluster, that is, a set of GNSS observations stored in the history buffer 38 to a cluster of navigation solutions, such as velocities, output by the INS 10. The cluster validation may be performed in the location domain. Prior to performing the cluster validation, the apparatus, such as the processing circuitry, of an example embodiment may be configured to initially determine if the GNSS observation includes a reference velocity. In an instance in which the GNSS observation fails to provide a reference velocity, the GNSS will be considered invalid and the position update provided by the GNSS observation will not be taken into account with respect to updating of the filter parameters, but will, instead, be removed from the history buffer so long as the navigation solution provided by the INS satisfies a predefined validation criteria. Additionally, in response to the GNSS observation being determined to be invalid, further processing is triggered to mitigate any error in the INS as described below.

However, in an instance in which the GNSS observation includes a reference velocity and as another condition to performing the cluster validation, the apparatus 30, such as the processing circuitry 32, of an example embodiment is configured to determine the ratio between: (i) a cluster of reference velocities from GNSS observations stored in the history buffer 38 over a period of time that includes the GNSS observation that is currently the subject of the validation inquiry and (ii) a cluster of velocities determined by the INS 10 over the same period of time. In an instance in which the ratio does not satisfy a predefined limit, the GNSS observation including both the position and velocity, are considered invalid, the GNS observation will also not be taken into account with respect to updating of the filter parameters and will, instead, be removed from the history buffer. As described below, further processing will also be triggered by the determination that the GNSS observation is invalid to mitigate any error in the INS.

In an instance in which the GNSS observation includes a reference velocity and the ratio is within the predefined limit and as a further precondition to performing the cluster validation, the apparatus 30, such as the processing circuitry 32, of an example embodiment may also be configured to compare the velocity determined by the INS 10 with respect to the reference velocity of the GNSS observation utilizing a maximum error comparison over the cluster size. In an instance in which the maximum error is exceeded, the GNSS observation will be considered invalid such that the GNS observation is not taken into account with respect to updating of the filter parameters and will, instead, be removed from the history buffer 38. Further processing will also be triggered as described below by the determination that the GNSS observation is invalid to mitigate any error in the INS.

However, in an instance in which the maximum error is satisfied, the GNSS observation will then be subjected to cluster validation. In this regard, the apparatus 30, such as the processing circuitry 32, is configured to validate the GNSS observation by estimating a distribution of GNSS observations over a given cluster size such that the behavior of the location data of the GNSS observations can be assessed and a measurable value determined to describe the behavior of the location data of the GNSS observations. In one example embodiment, the apparatus, such as the processing circuitry, is configured to evaluate the distribution, heading stability and position-versus-velocity. In this example embodiment, the cluster size is defined to be 5, but the cluster size is a configurable parameter and may be bigger or smaller in other embodiments.

In this regard, the apparatus 30, such as the processing circuitry 32, of an example embodiment may be configured to determine whether the distribution of the locations of a cluster of GNSS observations satisfy a predefined criteria. In an instance in which the distribution of the locations of a cluster of GNSS observations fails to satisfy the predefined criteria, the GNSS observation may be determined to be invalid and the GNSS observation will not be taken into account with respect to updating of the filter parameters, but will, instead, be removed from the history buffer 38 so long as the navigation solution provided by the INS 10 satisfies a predefined validation criteria. Additionally, in response to the GNSS observation being determined to be invalid, further processing is triggered to mitigate any error in the INS as described below. However, in an instance in which the distribution of the locations of the cluster of GNSS observations satisfies the predefined criteria, the heading stability may then be evaluated. In this regard, the apparatus, such as the processing circuitry is configured to determine whether the heading stability of the cluster of GNSS observations satisfies a predefined criteria. In an instance in which the heading stability of the cluster of GNSS observations fails to satisfy the predefined criteria, the GNSS observation may be determined to be invalid and the GNSS observation will not be taken into account with respect to updating of the filter parameters, but will, instead, be removed from the history buffer so long as the navigation solution provided by the INS satisfies a predefined validation criteria. Additionally, in response to the GNSS observation being determined to be invalid, further processing is triggered to mitigate any error in the INS as described below. However, in an instance in which the heading stability of the cluster of GNSS observations satisfies the predefined criteria, the position-versus-velocity may then be evaluated.

In relation to the position-versus-velocity validation, the apparatus 30, such as the processing circuitry 32, is configured to process observations in a cluster in sequence and to determine a prediction error utilizing the location and velocity of GNSS observations from previous epochs to predict the location and velocity of a GNSS observation for a subsequent epoch. In this example embodiment, the prediction error may be defined as:

$$\sqrt{\frac{\sum_{k=1}^{n}|e|^2}{n}}$$

wherein the prediction disclosure vector e at time epoch k is as follows:

$$e = p_k - [p_{k-1} + v_{k-1}\Delta f]$$

and $p_k$ is the position estimate of the GNSS observation at time epoch k, $v_k$ is the velocity estimate of a GNSS observation at time epoch k, n is the total number of observations and $\Delta t$ is a time interval between consecutive observations. In this example embodiment, an empirical pass criterion has been utilized to determine whether the position-versus-velocity validation criteria is satisfied. Although the cluster evaluation treats the observations as a group, a single pass criterion is utilized to evaluate the prediction error.

In an instance in which the apparatus 30, such as a processing circuitry 32, determines that the distribution of the locations of a cluster of GNSS observations does not satisfy a predefined criteria, determines that the heading stability of the cluster of GNSS observations does not satisfy a predefined criteria or determines that the position-versus-velocity of the cluster of GNSS observations fails to satisfy a predefined criteria, the GNSS observation will be considered invalid and removed from the history buffer 38 so as not to cause an update to the filter parameters. In addition, further processing will also be triggered as described below to mitigate any error in the INS. However, if the apparatus, such as the processing circuitry, determines that the GNSS observation satisfies the foregoing criteria for active validation, the GNSS observation remains within the history buffer and is utilized to update the filter parameters.

In this regard and as depicted in block 44 of FIG. 3, once the observations provided by the reference system 12 have been validated, the apparatus 30 includes means, such as the processing circuitry 32 or the like, for updating the filter parameters of the INS filters 20 based upon the observations by the reference system. The apparatus also includes means, such as the processing circuitry or the like, for determining the navigation solution of the INS 10, such as the position and velocity of the object that carries the INS based upon and utilizing the updated filter parameters. See block 46.

As shown in block 48 of FIG. 3, the apparatus 30 of an example embodiment also includes means, such as the processing circuitry 32 or the like, for determining whether a filter 20 of the INS 10 has deviated or diverged. Although the determination as to whether a filter has deviated or diverged is described herein and depicted in FIG. 3 to occur in addition to and subsequent to the determination shown in block 42 as to whether an observation by the reference system 12 is valid, these determinations may be performed in the opposite order or concurrently in other example embodiments of the present disclosure. In still further example embodiments, only one of these determinations is performed, such as by determining whether a filter has deviated or diverged or by determining whether an observation by the reference system is valid, without performing both of these determinations.

In relation to the determination as to whether a filter 20 has deviated or diverged as shown in block 48, the apparatus 30, such as the processing circuitry 32, is configured to evaluate the navigation solutions provided by the INS 10 while the filter is being updated based upon the GNSS observations. Although the deviation or divergence of a filter may be determined in various manners, the apparatus, such the processing circuitry, of an example embodiment is configured to determine the deviation or divergence of a filter of the INS by applying test statistics, such as a null hypothesis or other statistical criterion, e.g., a normalized innovation squared measure, to identify filter deviation or divergence from a true state.

In one example embodiment, the apparatus 30, such as the processing circuitry 32, is configured to determine deviation or divergence of the filter 20 by utilizing a null hypothesis in which the null hypothesis that the one or more observations of the reference system 12 are bias free is tested against a test hypothesis that the one or more observations of the reference system are biased to determine whether the filter has deviated or diverged. By way of example, the measurement model in the presence of biased samples O can be defined as follows:

$$z_k = h(x_k) + \Xi_k O_k + w_k$$

$\Xi$ wherein is matrix mapping the biases to the observations, k is the discrete time index, $x_k$ is the filter state at epoch k, $w_k$ measurement noise at epoch k and h( ) is a function that serves to calculate a predicted measurement from the state $x_k$. In this regard, $w_k$ may be assumed to be a zero-mean white noise sequence with a Gaussian distribution. In this example embodiment, the innovation sequence is biased by the term:

$$\Delta w_k = \Xi_k O_k$$

The update sequence is thus distributed as follows:

$$w_k | H_0 \sim N(0, C_{w_k})$$

$$w_k | H_1 \sim N(\Xi_k O_k, C_{w_k})$$

wherein N(a,b) is a normal distribution with mean a and variance b, $H_0$ and $H_1$ are hypothesis indicators for the null and test hypotheses, respectively, and $C_{w_k}$ is the innovation covariance. The innovation covariance does not change in the presence of a biased observation. The test statistics for testing $H_0$ against $H_1$ may then be defined as:

$$T_k = [(\Xi_k^T C_{w_k}^{-1} \Xi_k)^{-1} \Xi_k^T C_{w_k}^{-1} w_k]^T (\Xi_k^T C_{w_k}^{-1} \Xi_k)$$
$$[(\Xi_k^T C_{w_k}^{-1} \Xi_k)^{-1} \Xi_k^T C_{w_k}^{-1} w_k] = \hat{O}_k^T C_{\hat{O}_k}^{-1} \hat{O}_k$$

The test statistic distribution can also be defined as follows:

$$T_k | H_0 \sim \xi^2(d, 0)_v$$

$$T_k | H_1 \sim \xi^2(d, \delta_0^2)$$

Under the null hypothesis, the degrees of freedom are defined by d, that is, the number of biased observations, and δ0 provides a non-centrality parameter for the following distribution:

$$\delta_0^2 = \hat{O}_k^T C_{\hat{O}_k}^{-1} \hat{O}_k$$

In this example embodiment, the apparatus 30, such as the processing circuitry 32, is configured to determine that the null hypothesis test has failed and that the filter has deviated or diverged in an instance in which:

$$T_k \geq \xi_\alpha^2(d,0)$$

wherein α is the significance level.

In addition to or instead of the foregoing test, the apparatus 30 may also be configured to determine deviation or divergence of the filter 20 in other manners. For example, the apparatus of one example embodiment includes means, such as the processing circuitry 32 or the like, for determining deviation or divergence of the filter by utilizing a normalized innovation squared measure having a value that increases with increasing error to determine whether the filter has deviated or diverged, such as in an instance in which the value of the normalized innovation squared measure exceeds a predefined threshold. Additionally or alternatively, the apparatus, such as the processing circuitry, of another example embodiment may be configured to determine the deviation or divergence of the filter based upon a comparison of the navigation solutions of the INS as will be described below.

In an instance in which a filter 20 of the INS 10 has been determined to not have deviated or diverged or an observation by the reference system 12 has been determined to be valid, the apparatus 30 includes means, such as the processing circuitry 32 or the like, for receiving another observation from the reference system and then repeating the foregoing process as shown at block 50 of FIG. 3. With respect to a reference system in the form of a GNSS-based positioning system, the apparatus of FIG. 5 includes means, such as the processing circuitry or the like, for receiving observations from the GNSS providing information regarding the location and velocity of an object at a respective point in time. See block 70 of FIG. 5. Once the observation is updated, the apparatus of this example embodiment also includes means, such as the processing circuitry or the like, for updating the filter parameters based upon the location and velocity provided by the GNSS at the respective point in time. See block 72.

However, in an instance in which a filter 20 of the INS 10 has been determined to deviate or diverge or an observation by the reference system 12 has been determined to be invalid, the apparatus 30 includes means, such as the processing circuitry 32 or the like, for determining a prior point in time at which the performance of the filter was stable. See block 52 of FIG. 3. In this regard, the apparatus, such as the processing circuitry, may be configured to move the processing point back in time by backwards processing with reference to the history buffer 38. At each prior point in time during the backwards processing, the filter state conditions are evaluated to determine if the filter is stable. The filter state conditions may be evaluated in various manners, but, in one embodiment, the filter state conditions are evaluated utilizing the same type of tests as described above in order to determine whether a filter has deviated or diverged in order to determine a prior point in time at which the performance of the filter is stable and, more particularly, to determine the prior point in time at which the performance of the filter is stable and which is also closest in time to the time at which the filter was determined to have deviated or diverged or an observation by the reference system was determined to be invalid. In an embodiment in which the same tests are employed to determine the prior point in time at which the performance of the filter is stable as were employed to determine if a filter has deviated or diverged, more finely tuned criterion may be utilized during the backwards processing to determine the prior point in time at which the performance of the filter is stable than were employed to determine if a filter has deviated or diverged. For example, higher limits or otherwise more specifically adapted criterion may be utilized to determine the prior point in time at which the performance of the filter is stable than were employed to determine if a filter has deviated or diverged.

In some embodiments, the apparatus 30, such as the processing circuitry 32, of an example embodiment may also define a maximum length within the history buffer 38 that can be searched in order to identify a prior point in time at which performance of the filter 20 was stable. This search length may be adapted or fixed, but, in any event, is selected so as to avoid imposing an unnecessarily large computational load upon the processing circuitry while backwards processing.

Once the prior point in time is identified at which the performance of the filter 20 was determined to be stable, the apparatus 30 includes means, such as the processing circuitry 32 or the like, for identifying the filter parameters from the history buffer 38 that are associated with the prior point in time at which the performance of the filter was stable. See block 54 of FIG. 3. Thereafter, the apparatus includes means, such as the processing circuitry or the like, for forward processing sensor samples of the INS 10 that were captured subsequent to the prior point in time using the filter parameters from the history buffer at which the performance of the filter was stable. See block 56. In this regard, the apparatus, such as the processing circuitry, of an example embodiment is configured to forward process sensor samples of the INS without updating the filter parameter based upon the one or more observations by the reference system 12 that were captured between the prior point in time and a subsequent point in time at which the filter was determined to have deviated or diverged on one or more observations by the reference system were determined to be invalid. Additionally, in an example embodiment, the apparatus, such as the processing circuitry, is configured to forward process sensor samples of the INS without updating the filter parameters based upon any observations of the reference system in order to recover the navigation solution of the INS. By recovering the navigation solution of the INS in this manner, the one or more errors previously introduced by at least one of the one or more observations by the reference system 12 are mitigated. The foregoing process of error mitigation may be repeated for each or at least a plurality of the filters of the INS in order to provide more comprehensive error mitigation.

Although several techniques for determining the deviation or divergence of a filter 20 of the INS 10 were described above, the apparatus 30, such as the processing circuitry 32, of an example embodiment is configured to determine the deviation or divergence of the filter in the manner set forth in FIG. 6, either in addition to or instead of the techniques described above. In this example embodiment, the apparatus includes means, such as the processing circuitry or the like, for determining a second navigation solution of the INS utilizing a second filter having filter parameters that have not been updated based upon the one or more observations by the reference system 12 after the prior point in time at which performance of the filter is stable. See block 80. As shown in blocks 82 and 84, the apparatus of this example embodiment also includes means, such as the processing circuitry or the like, for comparing the navigation solution of the INS that was determined as shown in block 46 of FIG. 3 with the filter parameters having been updated based upon the observation(s) by the reference system to the second navigation solution of the INS and means, such as processing circuitry or the like, for determining whether the filter has deviated or diverged based upon a difference between the navigation solution of the INS that was determined as shown in block 46 of FIG. 3 and the second navigation solution of the INS. For example, the apparatus, such as the processing circuitry, may be configured to determine that the filter has deviated or diverged in an instance in which the difference between the navigation solution of the INS and the second navigation solution of the INS differ by more than a predefined amount. As such, the apparatus of this alternative embodiment may be configured to determine that the filter has deviated or diverged based upon a comparison of the navigation solutions that are generated using filters that have been differently updated by observations by the reference system.

A method, apparatus 30 and computer program product are therefore provided in accordance with an example embodiment in order to provide for error mitigation in an INS 10 that relies upon a reference system 12, such as a satellite-based positioning system, to determine or update filter parameters. In response to determining one or more of: (i) deviation or divergence of a filter 20 of the INS or (ii) that one or more observations by the reference system are invalid, the sensor samples of the INS are processed to determine the navigation solution using filter parameters that are determined in such a manner as to mitigate one or more errors previously introduced by an inaccurate observation of the reference system. As a result, the method, apparatus and computer program product of an example embodiment can more improve or correct the performance of the INS in a more timely manner such that the INS generates a more accurate navigation solution in a more consistent manner and such that any inaccuracies in the navigation solution introduced by an inaccurate observation of a satellite-based positioning system can be more quickly remedied while continuing to provide a navigation solution.

As described above, FIGS. 3-6 are flow diagrams of an apparatus 30, method, and computer program product configured to mitigate errors in an INS that relies upon a reference system to determine or update filter parameters according to an example embodiment. It will be understood that each block of the flow diagrams, and combinations of blocks in the flow diagrams, may be implemented by various means, such as hardware, firmware, processing circuitry 32, and/or other devices associated with execution of software including one or more computer program instructions. For example, one or more of the procedures described above may be embodied by computer program instructions. In this regard, the computer program instructions which embody the procedures described above may be stored by the memory device 34 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for error mitigation in an inertial navigation system (INS) that relies upon a reference system to determine or update filter parameters of a plurality of filters, the method comprising:
receiving, by a computing device of the INS or in communication with the INS, one or more observations from the reference system comprising a Global Navigation Satellite System (GNSS)-based positioning system, wherein the one or more observations are indicative of movement of an object which requires a navigation solution;
storing, by the computing device, the one or more observations in a history buffer;
performing, by the computing device, a pre-validation of an observation of the one or more observations based on a fix availability, a velocity solution availability and a position solution availability followed by an active validation of the one or more observations pursuant to at least one of a velocity validation or a cluster validation of the one or more observations, wherein the pre-validation comprises validating the observation independent of the navigation solution, and wherein the active validation comprises validating the observation while the INS is in operation and prior to updating the filter parameters based upon the one or more observations;

determining, by the computing device, one or more of: (i) deviation or divergence of a respective filter of the plurality of filters of the INS in an instance in which a difference between navigation solutions of the INS utilizing the respective filter and utilizing a second filter is more than a predefined amount or (ii) that the one or more observations by the reference system are invalid pursuant to the pre-validation or the active validation of the one or more observations;

in response to determining one or more of (i) the deviation or divergence of the respective filter or (ii) that the one or more observations by the reference system are invalid, identifying, by the computing device, the filter parameters from the history buffer associated with a prior point in time at which performance of the respective filter is stable, wherein the filter parameters were updated at least once based upon the one or more observations by the reference system between the prior point in time and a subsequent point in time at which the respective filter was determined to deviate or diverge or the one or more observations by the reference system were determined to be invalid; and forward processing, by the computing device, sensor samples of the INS obtained subsequent to the prior point in time using the filter parameters from the history buffer at which performance of the respective filter was stable, thereby mitigating one or more errors previously introduced by at least one of the one or more observations by the reference system, wherein the determining, identifying and forward processing are repeated for one or more other filters of the INS.

2. A method according to claim 1, wherein forward processing sensor samples of the INS comprises forward processing sensor samples of the INS without updating the filter parameters based upon the one or more observations by the reference system between the prior and subsequent points to recover the navigation solution of the INS.

3. A method according to claim 1, wherein forward processing sensor samples of the INS comprises forward processing sensor samples of the INS without updating the filter parameters based upon any observations of the reference system to recover the navigation solution of the INS.

4. A method according to claim 1, further comprising storing, in the history buffer, historical values of at least: (i) the filter parameters and (ii) the sensor samples by the reference system.

5. A method according to claim 1, wherein the method further comprises:
receiving observations from the GNSS providing information regarding a location and velocity of a body at a respective point in time; and
updating the filter parameters based upon the location and velocity provided by the GNSS at the respective point in time.

6. A method according to claim 1, wherein determining deviation or divergence of the respective filter comprises utilizing a null hypothesis in which the null hypothesis that the one or more observations of the reference system are bias free is tested against a test hypothesis that the one or more observations of the reference system are biased to determine whether the respective filter has deviated or diverged.

7. A method according to claim 1, wherein determining deviation or divergence of the respective filter comprises utilizing a normalized innovation squared measure having a value that increases with increasing error to determine whether the respective filter has deviated or diverged.

8. A method according to claim 1, wherein determining deviation or divergence of the respective filter comprises:
determining a second navigation solution of the INS utilizing the second filter having filter parameters that have not been updated based upon the one or more observations by the reference system following the prior point in time;
comparing the navigation solution of the INS that relies upon filter parameters that have been updated by the one or more observations by the reference system to the second navigation solution of the INS; and
determining whether the respective filter has deviated or diverged based upon a difference between the navigation solution of the INS to the second navigation solution of the INS.

9. A method according to claim 1, further comprising validating the one or more observations by the reference system prior to updating the filter parameters based upon the one or more observations by the reference system, wherein validating a respective observation of the one or more observations comprises comparing a reference location and a reference velocity defined by the respective observation by the reference system to a location and a velocity of an object determined by the INS utilizing a filter having filter parameters that have not been updated by the respective observation by the reference system.

10. A method according to claim 1, further comprising validating the one or more observations by the reference system prior to updating the filter parameters based upon the one or more observations by the reference system, wherein validating a respective observation of the one or more observations comprises evaluating the respective observation by the reference system without consideration of the navigation solution of the INS, and wherein evaluating the respective observation by the reference system comprises evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

11. An apparatus configured to facilitate error mitigation in an inertial navigation system (INS) that relies upon a reference system to determine or update filter parameters of a plurality of filters, the apparatus comprising processing circuitry and at least one memory including computer program code, the at least one memory and the computer program code configured to, with the processing circuitry, cause the apparatus at least to:
receive by a computing device, one or more observations from the reference system comprising a Global Navigation Satellite System (GNSS)-based positioning system, wherein the one or more observations are indicative of movement of an object which requires a navigation solution;
store, by the computing device, the one or more observations in a history buffer;

perform a pre-validation of an observation of the one or more observations based on a fix availability, a velocity solution availability and a position solution availability followed by an active validation of the one or more observations pursuant to at least one of a velocity validation or a cluster validation of the one or more observations, wherein the pre-validation comprises validating the observation independent of the navigation solution, wherein the pre-validation comprises validating the observation independent of the navigation solution, and wherein the active validation comprises validating the observation while the INS is in operation and prior to updating the filter parameters based upon the one or more observations;

determine one or more of: (i) deviation or divergence of a respective filter of the plurality of filters of the INS in an instance in which a difference between navigation solutions of the INS utilizing the respective filter and utilizing a second filter is more than a predefined amount or (ii) that the one or more observations by the reference system are invalid pursuant to the pre-validation or the active validation of the one or more observations;

in response to determining one or more of: (i) the deviation or divergence of the respective filter or (ii) that the one or more observations by the reference system are invalid, identify, by the computing device, the filter parameters from the history buffer associated with a prior point in time at which performance of the respective filter is stable, wherein the filter parameters were updated at least once based upon the one or more observations by the reference system between the prior point in time and a subsequent point in time at which the respective filter was determined to deviate or diverge or the one or more observations by the reference system were determined to be invalid; and forward process, by the computing device, sensor samples of the INS obtained subsequent to the prior point in time using the filter parameters from the history buffer at which performance of the respective filter was stable, thereby mitigating one or more errors previously introduced by at least one of the one or more observations by the reference system, wherein the apparatus is caused to repeatedly determine, identify and forward process for one or more other filters of the INS, and wherein the computing device is comprised by the INS or is in communication with the INS.

12. An apparatus according to claim 11, wherein the at least one memory and the computer program code are configured to, with the processing circuitry, cause the apparatus to forward process sensor samples of the INS by forward process sensor samples of the INS without updating the filter parameters based upon the one or more observations by the reference system between the prior and subsequent points to recover the navigation solution of the INS.

13. An apparatus according to claim 11, wherein the at least one memory and the computer program code are further configured to, with the processing circuitry, cause the apparatus to store, in the history buffer, historical values of at least: (i) the filter parameters and (ii) the sensor samples by the reference system.

14. An apparatus according to claim 11, wherein the at least one memory and the computer program code are further configured to, with the processing circuitry, cause the apparatus to:

receive observations from the GNSS providing information regarding a location and velocity of a body at a respective point in time; and update the filter parameters based upon the location and velocity provided by the GNSS at the respective point in time.

15. An apparatus according to claim 11, wherein the at least one memory and the computer program code are configured to, with the processing circuitry, cause the apparatus to determine deviation or divergence of the respective filter by utilizing a null hypothesis in which the null hypothesis that the one or more observations of the reference system are bias free is tested against a test hypothesis that the one or more observations of the reference system are biased to determine whether the respective filter has deviated or diverged.

16. An apparatus according to claim 11, wherein the at least one memory and the computer program code are configured to, with the processing circuitry, cause the apparatus to determine deviation or divergence of the respective filter by utilizing a normalized innovation squared measure having a value that increases with increasing error to determine whether the respective filter has deviated or diverged.

17. An apparatus according to claim 11, wherein the at least one memory and the computer program code are configured to, with the processing circuitry, cause the apparatus to determine deviation or divergence of the respective filter by:

determining a second navigation solution of the INS utilizing the second filter having filter parameters that have not been updated based upon the one or more observations by the reference system between the prior and subsequent points in time;

comparing the navigation solution of the INS that relies upon filter parameters that have been updated by the one or more observations by the reference system to the second navigation solution of the INS; and determining whether the respective filter has deviated or diverged based upon a difference between the navigation solution of the INS to the second navigation solution of the INS.

18. An apparatus according to claim 11, wherein the at least one memory and the computer program code are further configured to, with the processing circuitry, cause the apparatus to:

validate the one or more observations by the reference system prior to updating the filter parameters based upon the one or more observations by the reference system; and validate a respective observation of the one or more observations by comparing a reference location and a reference velocity defined by the respective observation by the reference system to a location and a velocity of a body determined by the INS utilizing a filter having filter parameters that have not been updated by the respective observation by the reference system.

19. An apparatus according to claim 11, wherein the at least one memory and the computer program code are further configured to, with the processing circuitry, cause the apparatus to:

validate the one or more observations by the reference system prior to updating the filter parameters based upon the one or more observations by the reference system; and evaluate the respective observation by the reference system by evaluating: (i) an uncertainty associated with a reference location and a reference velocity defined by the respective observation by the reference system relative to predefined uncertainty criteria, (ii) an availability of the reference velocity relative to predefined velocity criteria and (iii) an availability and valuation of the reference position relative to predefined position criteria.

20. A computer program product configured to facilitate error mitigation in an inertial navigation system (INS) that relies upon a reference system to determine or update filter parameters of a plurality of filters, the computer program product comprising at least one non-transitory computer-readable storage medium having computer-executable program code instructions stored therein, and wherein the computer-executable program code instructions comprise program code instructions to cause, upon execution, a computing device to:

receive one or more observations from the reference system comprising a Global Navigation Satellite System (GNSS)-based positioning system, wherein the one or more observations are indicative of movement of an object which requires a navigation solution;

store the one or more observations in a history buffer;

perform a pre-validation of an observation of the one or more observations based on a fix availability, a velocity solution availability and a position solution availability followed by an active validation of the one or more observations pursuant to at least one of a velocity validation or a cluster validation of the one or more observations, wherein the pre-validation comprises validating the observation independent of the navigation solution, and wherein the active validation comprises validating the observation while a filter of the INS is in operation and prior to updating the filter parameters based upon the one or more observations;

determine one or more of: (i) deviation or divergence of a respective filter of the plurality of filters of the INS in an instance in which a difference between navigation solutions of the INS utilizing the respective filter and utilizing a second filter is more than a predefined amount or (ii) that the one or more observations by the reference system are invalid pursuant to the pre-validation or the active validation of the one or more observations;

in response to determining one or more of: (i) the deviation or divergence of the respective filter or (ii) that the one or more observations by the reference system are invalid, identify the filter parameters from the history buffer associated with a prior point in time at which performance of the respective filter is stable, wherein the filter parameters were updated at least once based upon the one or more observations by the reference system between the prior point in time and a subsequent point in time at which the respective filter was determined to deviate or diverge or the one or more observations by the reference system were determined to be invalid; and forward process sensor samples of the INS obtained subsequent to the prior point in time using the filter parameters from the history buffer at which performance of the respective filter was stable, thereby mitigating one or more errors previously introduced by at least one of the one or more observations by the reference system, wherein the computing device is caused to repeatedly determine, identify and forward process for one or more other filters of the INS, and wherein the computing device is comprised by the INS or is in communication with the INS.

* * * * *